US008253964B2

(12) United States Patent  
Kondo

(10) Patent No.: US 8,253,964 B2
(45) Date of Patent: Aug. 28, 2012

(54) IMAGE FORMING APPARATUS WITH SUPERIOR PRINT CANCELING

(75) Inventor: Kazutoshi Kondo, Niigata (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1129 days.

(21) Appl. No.: 11/055,091

(22) Filed: Feb. 11, 2005

(65) Prior Publication Data

US 2006/0061797 A1 Mar. 23, 2006

(30) Foreign Application Priority Data

Sep. 21, 2004 (JP) ................................. 2004-273064

(51) Int. Cl.
*G06K 15/00* (2006.01)
(52) U.S. Cl. ..................... 358/1.16; 358/1.14; 358/1.15; 358/498
(58) Field of Classification Search ................. 358/1.16, 358/1.14, 1.15, 498
See application file for complete search history.

(56) References Cited

U.S. PATENT DOCUMENTS

| | | | | | |
|---|---|---|---|---|---|
| 5,512,928 | A | * | 4/1996 | Kato et al. | 347/138 |
| 6,151,464 | A | * | 11/2000 | Nakamura et al. | 399/79 |
| 6,327,051 | B1 | * | 12/2001 | Moro et al. | 358/1.9 |
| 6,388,759 | B1 | * | 5/2002 | Yoshida et al. | 358/1.13 |
| 6,493,100 | B1 | * | 12/2002 | Endo et al. | 358/1.14 |
| 6,606,466 | B2 | * | 8/2003 | Sato | 399/82 |
| 6,618,566 | B2 | * | 9/2003 | Kujirai et al. | 399/79 |
| 6,752,548 | B2 | * | 6/2004 | Azami | 400/76 |
| 6,817,794 | B2 | * | 11/2004 | Kakutani | 400/582 |
| 6,831,751 | B1 | * | 12/2004 | Mori | 358/1.13 |
| 7,031,003 | B2 | * | 4/2006 | Nagai et al. | 358/1.13 |
| 2002/0063881 | A1 | * | 5/2002 | Nakata et al. | 358/1.14 |
| 2002/0085186 | A1 | * | 7/2002 | Sawada | 355/40 |
| 2003/0025928 | A1 | * | 2/2003 | Nagasawa et al. | 358/1.14 |
| 2003/0053110 | A1 | * | 3/2003 | Lester et al. | 358/1.14 |
| 2003/0081238 | A1 | * | 5/2003 | Lester et al. | 358/1.14 |
| 2004/0120000 | A1 | * | 6/2004 | Onuma et al. | 358/1.14 |
| 2004/0156061 | A1 | * | 8/2004 | Kobayashi | 358/1.12 |

FOREIGN PATENT DOCUMENTS

| | | |
|---|---|---|
| JP | 05-77525 | 3/1993 |
| JP | 08-310083 | 11/1996 |
| JP | 10058788 A * | 3/1998 |
| JP | A-10-058788 | 3/1998 |
| JP | A-11-355496 | 12/1999 |

(Continued)

OTHER PUBLICATIONS

Feb. 5, 2010 Office Action issued in Japanese patent application No. 2004-273064 (with translation).

(Continued)

*Primary Examiner* — Jacky X Zheng
(74) *Attorney, Agent, or Firm* — Oliff & Berridge, PLC

(57) ABSTRACT

An UI device includes a display unit, a cancel button, an execution button, and print data selection buttons. Identification information of print data during printing is displayed on the display unit, and when the cancel button is pressed for a predetermined time, the print data during printing is canceled. Further, when the pressed time is less than the predetermined time, a list of identification information of the print data is shown so that one of print data can be selected with the print data selection buttons and the selection to cancel is determined with the execution button, thereby canceling the print data.

6 Claims, 11 Drawing Sheets

FOREIGN PATENT DOCUMENTS

| | | | |
|---|---|---|---|
| JP | 2000-020255 | | 1/2000 |
| JP | 2000020255 A | * | 1/2000 |
| JP | A-2000-103146 | | 4/2000 |
| JP | A-2004-171044 | | 6/2004 |
| JP | 2004-243746 | | 9/2004 |

OTHER PUBLICATIONS

Office Action issued in JP Application No. 2004-273064 on Jun. 11, 2010 (with English translation).

* cited by examiner

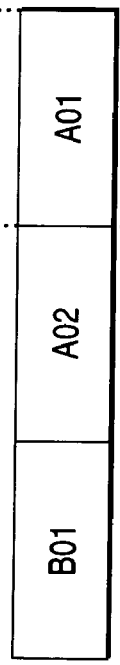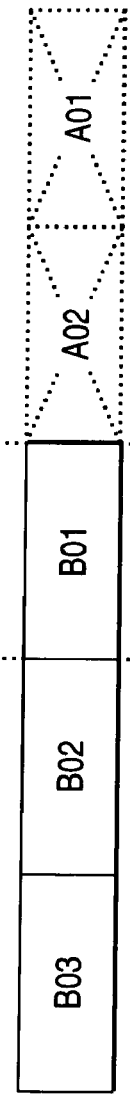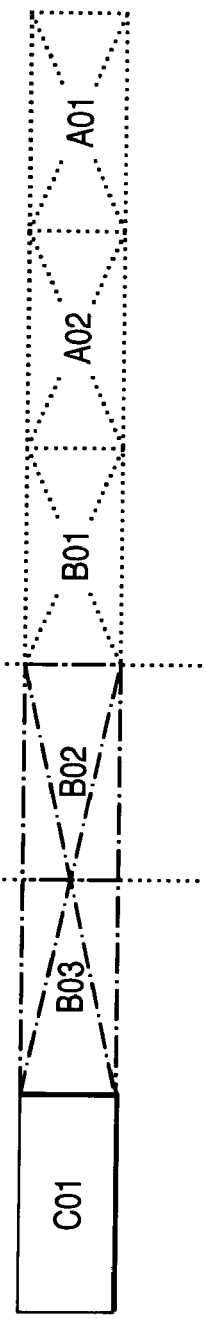
FIG. 7A
FIG. 7B
FIG. 7C

IMAGE FORMING APPARATUS WITH SUPERIOR PRINT CANCELING

BACKGROUND OF THE INVENTION

1. Field of the Invention

The present invention relates to an image forming apparatus for outputting print data written in a host computer, etc.

2. Background Art

As an image forming apparatus, an image forming apparatus having a print data cancel function has already been known, (for example, see JP-A-5-77525 and JP-A-2000-20255).

For example, JP-A-5-77525 discloses that a cancel switch on a control panel is pressed to clear all data remaining in a print controller unit. According to this conventional art, an unnecessary print or paper jam is prevented at the time of canceling the print, thereby reducing paper waste. However, since all data are cleared, even unintended print data may be canceled.

In addition, JP-A-2000-20255 discloses that a print unit is designated by a job name, in which a process from the start to the end of the print data is used as one unit to cancel the print data. Therefore, the print data corresponding to a job name that a user selects can be canceled. However, with the recent improvements in printing speed, among jobs to be canceled, a job awaiting to be canceled may already have been printed, ending up in a waste.

SUMMARY OF THE INVENTION

The present invention has been made to solve the problems of the conventional arts, and it is an object of the present invention to provide an image forming apparatus capable of maximally decreasing paper waste by ensuring that a cancel instruction is given to selected print data awaiting to be printed in addition to immediately canceling print data currently being printed.

In order to solve the above-mentioned problems, the present invention provides an image forming apparatus including: a display unit; a printing unit; a cancel unit for stopping printing by means of the printing unit; and a display control unit for allowing identification information of the print data which is printing or which is waiting for printing to be displayed on the display unit, based on a control state of the cancel unit.

The cancel unit may enable print data to be canceled by changing a control time of a cancel instruction. Therefore, the print data currently being printed can be immediately canceled with an easy control.

The cancel unit may enable displayed print data to be canceled by sequentially displaying identification information of print data on the display unit. Therefore, a user can check print data to cancel, with sequentially displayed print data identification information.

The cancel unit may enable print data under a print stop state to be canceled. Therefore, by canceling print data under the print stop state and processing the next print data, throughput degradation can be prevented.

The cancel unit may include a cancel button for activating a cancel instruction, and an execution button for determining the cancel instruction. Therefore, by arranging a button for activating a cancel instruction and a button for determining a cancel instruction, a malfunction due to a double clicking a button can be prevented.

The cancel unit may include a cancel button for activating a cancel instruction and for determining the cancel instruction. Therefore, the cancel button also determines the cancel instruction so that the number of control buttons is reduced.

The cancel unit may include a selection button for selecting print data.

According to the present invention, print data currently being printed can be canceled based on a control state of a cancel button, so that the print data can be immediately canceled and paper waste can be suppressed to the minimum. In addition, according to the image forming apparatus of the present invention, print data that the user intends to cancel can be canceled.

BRIEF DESCRIPTION OF THE DRAWINGS

These and other objects and advantages of this invention will become more fully apparent from the following detailed description taken with the accompanying drawings in which:

FIGS. 7A to 7C are schematic diagrams showing print data controlled in a control program for use in an image forming apparatus according to a first embodiment of the present invention;

DETAILED DESCRIPTION OF THE PREFERRED EMBODIMENTS

Hereinafter, preferred embodiments of the present invention will be described with reference to the accompanying drawings.

Figure 1:
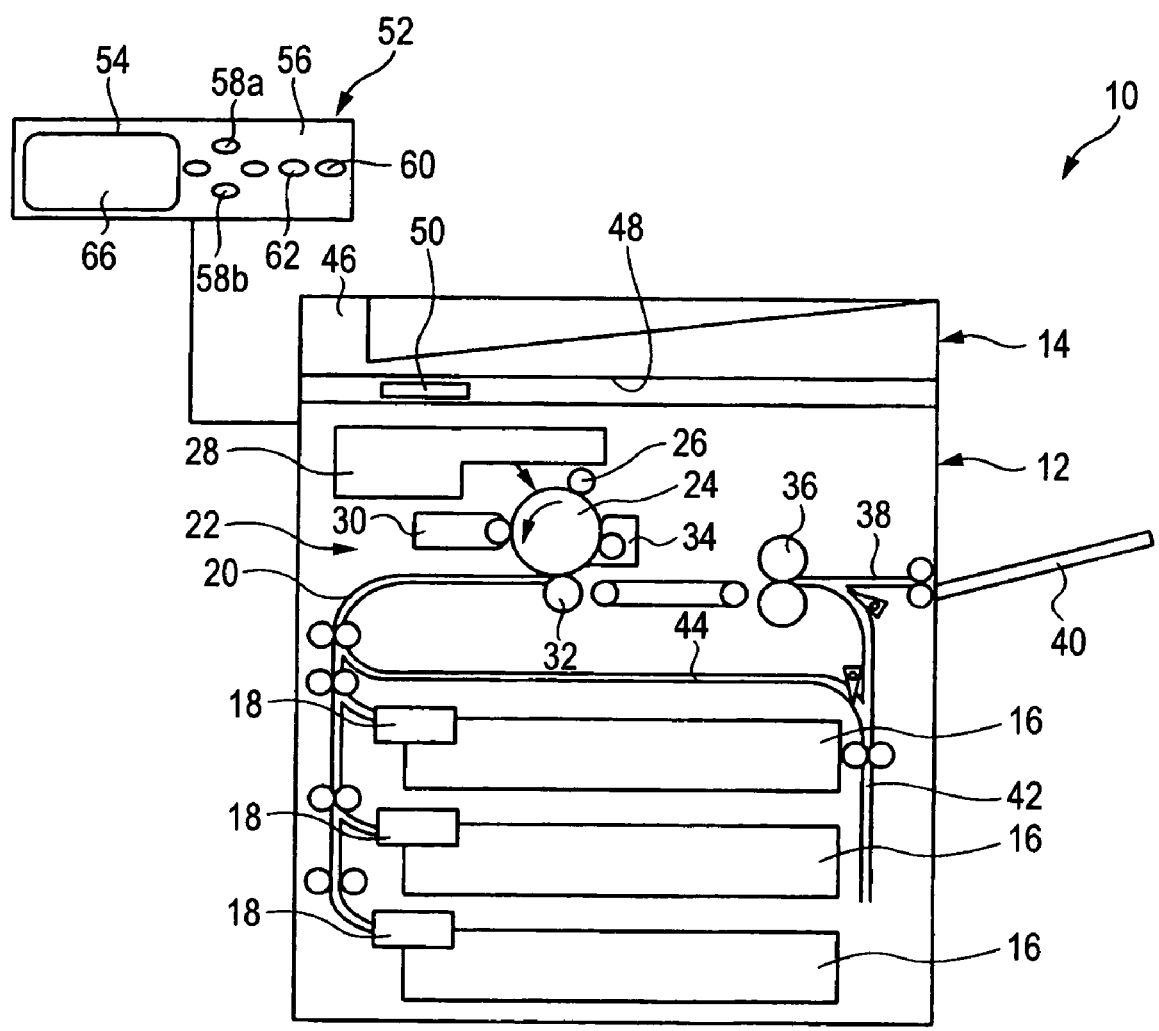
FIG. 1 is a side view showing an image forming apparatus according to a first embodiment of the present invention.

In FIG. 1, an image forming apparatus 10 includes a print unit 12 and a scan unit 14, and a print unit 12 has three paper feed trays 16, for example, each of which has a supply head 18. When one of the paper feed trays 16 is selected, the supply head 18 is operated to supply a paper to a print engine 22 through a paper feed path 20.

The print engine 22 uses, for example, a xerography, including a photoreceptor 24, a charging roll 26 for electrically charging a surface of the photoreceptor 24 in the same manner, a laser recording device 28 for recording a latent image into the photoreceptor 24, a developing device 30 for developing a toner image into the photoreceptor 24, a transferring roll 32 for transferring the developed toner image into a sheet, a cleaner 34 for removing the remaining toner, and a fixing device 36 for fixing the toner image of the sheet. The charging roll 26 electrically charges the surface of the photoreceptor 24 into the same polarity, the laser recording device 28 forms a latent image, the developing device 30 develops the latent image, and the transferring roll 32 transfers the developed latent image into the sheet and the fixing device 36 fixes the sheet to discharge from a sheet discharging path 38 into a discharging tray 40.

However, when established in a both-sided print, the sheet whose surface is fixed by the fixing device 36 is sent from the sheet discharging path 38 into a reversing device 42, is reversed at the reversing device 42, is sent to a sheet reversing path 44, and is brought back to the sheet feed path 20 and to the print engine 22, so that a rear side of the sheet is printed.

The scan unit 14 has an automatic paper transport device 46 such as a DADF, with which both sides of a paper can be read. Further, the automatic paper transport device 46 transports the paper to a platen 48, and a reading unit 50 made of CCDs on the platen 48 reads images on the paper. In addition, the image forming apparatus 10 may include a communication device, which is not shown, through which images are transmitted and received with a fax, or images transmitted from a host computer can be printed.

A user interface device (UI device) 52 is arranged in the image forming apparatus 10 in a body or through a network, for use in selecting or displaying processing contents of the image forming apparatus 10. The UI device 52 has, for example, a liquid crystal display panel 54 and a control panel 56 on which control buttons are arranged. Print data selection buttons 58a and 58b are arranged on the control panel 56. When one of the print data selection buttons 58a and 58b is pressed, a print data selection moves upwardly, while when the other of the print data selection buttons 58a and 58b is pressed, the print data selection moves downwardly. In addition, a cancel button 60 for instructing cancel and an execution button 62 for determining selection are arranged on the control panel 56. Further, the display panel 54 has a display unit 66 for displaying identification information of print data and processing contents or the like thereon.

Figure 2:
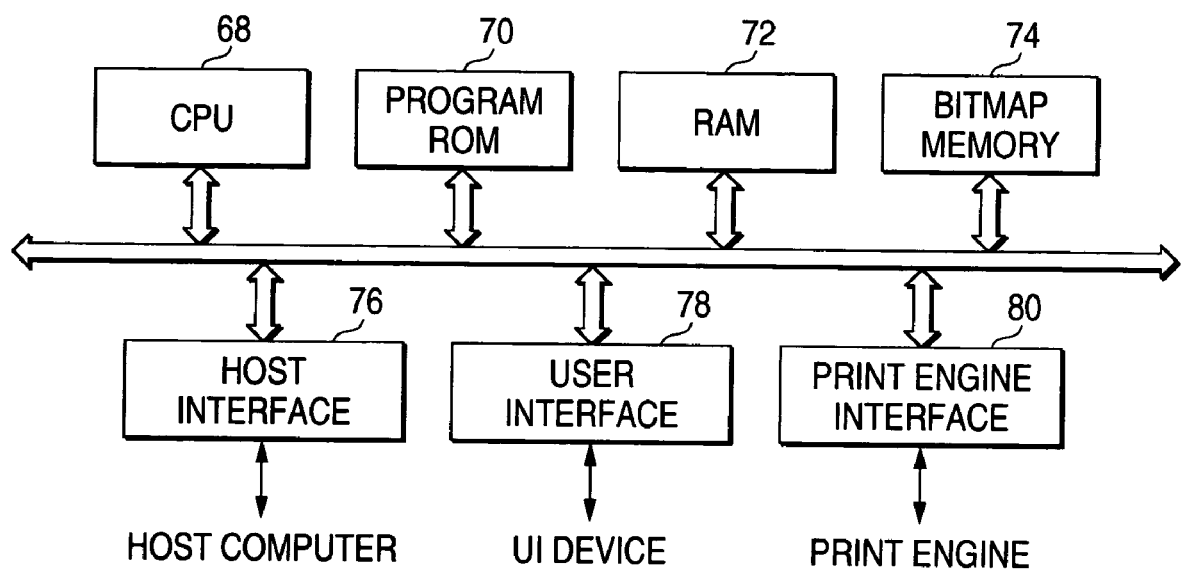
FIG. 2 is a block diagram showing a control circuit for use in an image forming apparatus according to a first embodiment of the present invention.

FIG. 2 shows an example of a control circuit of the image forming apparatus. To the control circuit, a CPU 68, a program ROM 70, a RAM 72, a bitmap memory 74, a host interface 76, a user interface 78 and a print engine interface 80 are connected through a bus. The CPU 68 sequentially stores data transmitted from the host computer into the RAM 72 according to the program recorded into the program ROM 70, develops images from the RAM 72 into the bitmap memory 74, and transmits the developed images to the print engine interface 80 as video signals. When the print data is transmitted from the print engine interface 80 to the above-mentioned print engine 22, the print engine is driven to execute printing based on the same print data.

In addition, the CPU 68 runs a program corresponding to the pressed switch to execute a function allocated to each switch, by pressing a switch of the control panel 56 of the UI device 52 described above.

Figure 3:
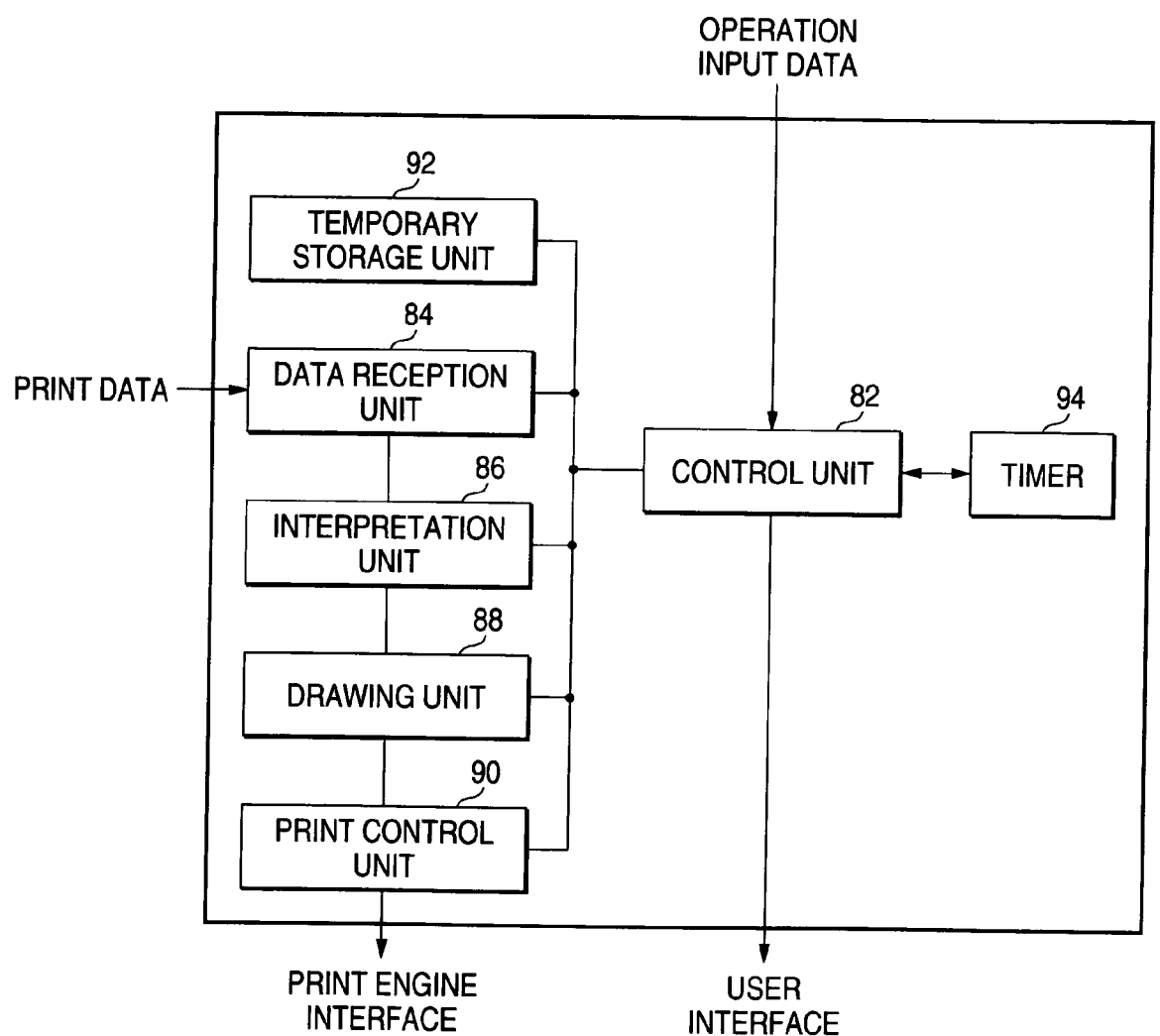
FIG. 3 is a block diagram showing a control program for use in an image forming apparatus according to a first embodiment of the present invention.

FIG. 3 shows contents of a print data management program for use in the image forming apparatus.

The control unit 82 is connected to a data reception unit 84, an interpretation unit 86, a drawing unit 88, a print control unit 90, and a temporary storage unit 92. The print data from the host computer is input to the data reception unit 84. The data reception unit 84 sequentially stores print data such that the input print data is printed in the sequence of being inputted. The control unit 82 delivers the first print data stored in the data reception unit 84 into the interpretation unit 86. The interpretation unit 86 interprets commands or the like in the print data. When the command is interpreted, the data is developed as electronic image data at the drawing unit 88. The electronic image data is image data printed on each page of the print paper, which includes bitmap data. The print control unit 90 converts the electronic image data into a video signal, and transmits the video signal from the above-mentioned print engine interface 80 to the print engine 22.

In addition, in the control unit 82, control input data is input from the control panel 56. A timer 94 is driven when the cancel instruction of print data for the control input data is input, and time up data is input to the control unit 82. In addition, when the control input data is input from the control panel 56, the control unit 82 stores information on the print data during printing into the temporary storage unit 92. In addition, the control unit 82 displays identification information or situation of the print data of the data reception unit 84 on the display panel 54 through the user interface 78.

An operation of the embodiment of the present invention constructed as described above will now be illustrated with reference to FIGS. 4 to 6.

Figure 4:
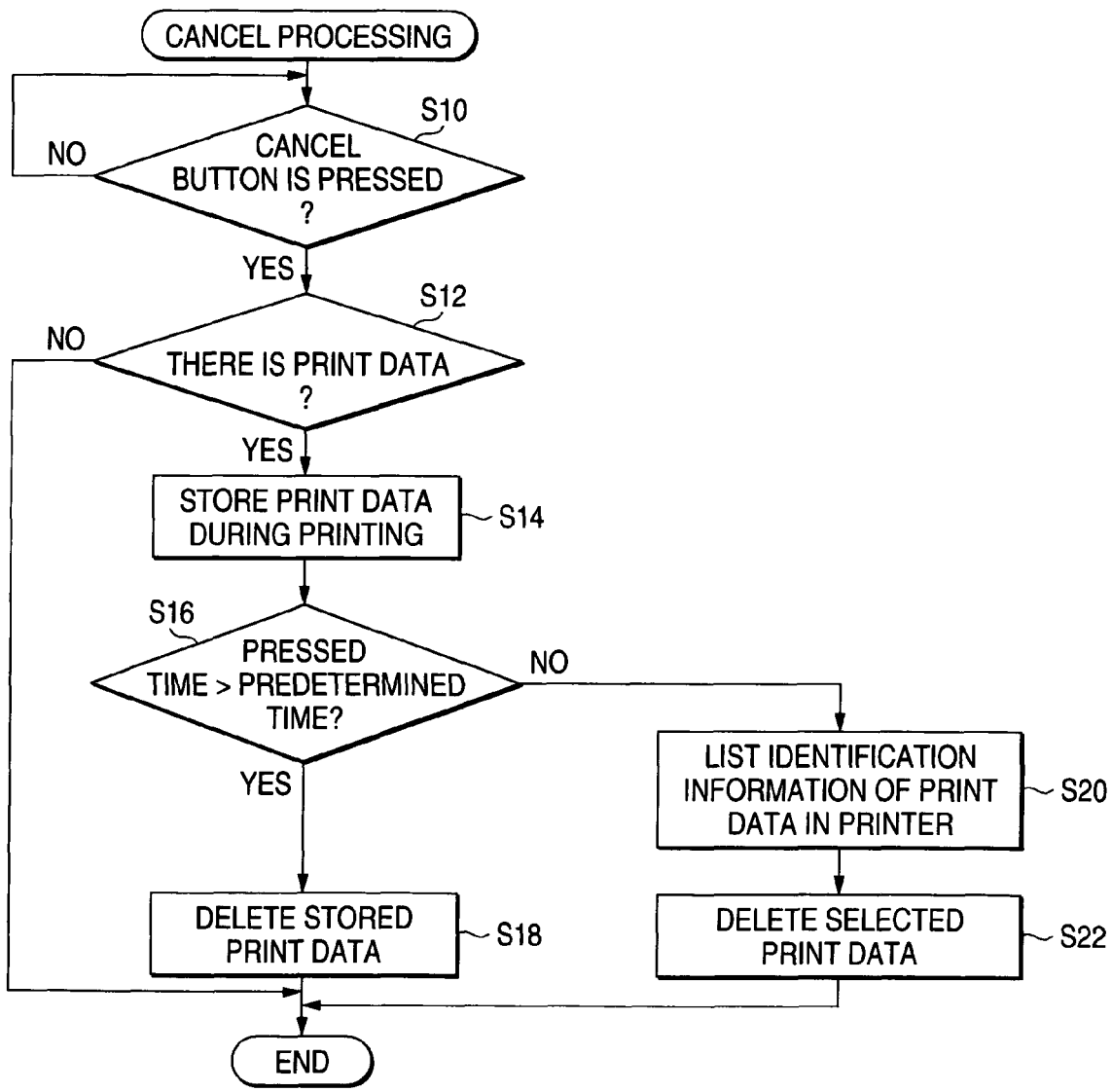
FIG. 4 is a flowchart illustrating a part of an operation flow of a control program for use in an image forming apparatus according to a first embodiment of the present invention.

As shown in FIG. 4, when a cancel processing of a print control program begins, first in step S10, it is determined whether the cancel button 60 is pressed. When it is determined that the cancel button 60 is pressed, the processing proceeds into the step S12. When it is determined that the cancel button 60 is not pressed, the processing returns to the step S10 to determine whether the cancel button 60 is pressed. In other words, it is checked that the cancel button 60 is pressed. In addition, when the cancel button 60 is pressed, the timer 94 is driven to count a time when the cancel button 60 is pressed.

In step S12, it is determined whether there exists print data in the data reception unit 84. When it is determined that there exist print data in the data reception unit 84, the processing proceeds into the step S14 to store the print data during printing into the temporary storage unit 92. In addition, identification information of the print data during printing is displayed onto the display unit 66 of the display panel 54. In an example of FIG. 5, the display unit 66 of the display panel 54 displays a state where "printing" and "A4 10 sheets" are displayed. As a result, a user can identify the print data during printing. Further, when it is determined that there is no print data in the step S12, the cancel processing ends.

Next, in step S16, it is determined whether the cancel button 60 is pressed for a predetermined time. In other words, it is determined whether the timer 94 driven at the step S10 is time-up. When it is determined that the cancel button 60 is pressed for a predetermined time, the processing proceeds into the step S18 and removes print data stored in the temporary storage unit 92 at the step S14. Therefore, the print data during printing can be canceled only by pressing the cancel button 60 for a predetermined time. Thus, the operation may be immediately canceled with an easy control, so that paper waste can be suppressed to the minimum.

Figure 5:
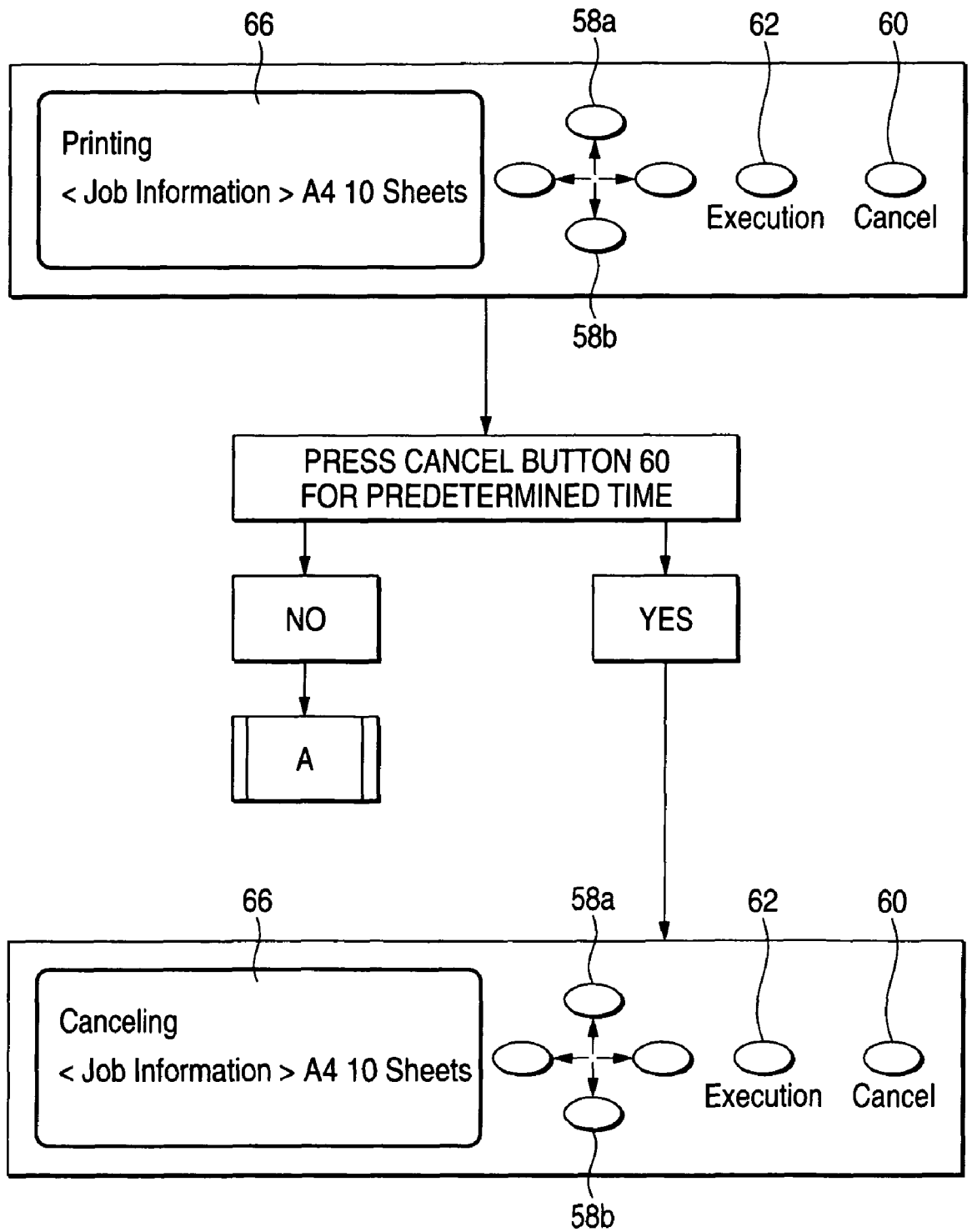
FIG. 5 is a flowchart illustrating a part of a display flow of an UI device for use in an image forming apparatus according to a first embodiment of the present invention.

In the example of FIG. 5, the print data stored in the temporary storage unit 92 at the step S14 is canceled, and the display unit 66 of the display panel 54 displays a state where "canceling" and "A4 10 sheets" are displayed. As a result, a user can identify the canceled print data.

In step S18, when the print data stored in the temporary storage unit 92 is deleted, the cancel processing ends.

On the other hand, when it is determined that the cancel button 60 is not pressed for a predetermined time, i.e., when it is determined that the button-pressed time does not reach to the predetermined time, the processing proceeds into the step S20 to list identification information of the print data stored in the data reception unit 84 on the display unit 66 of the display panel 54. In an example of FIG. 6, for example, two pieces of identification information of the print data are shown on the display unit 66 of the display panel 54.

Next, in step S22, the print data selected from the print data listed on the display unit 66 of the display panel 54 is deleted. In an example of FIG. 6, when the print data selection buttons 58a and 58b are pressed, identification information of the print data displayed as, for example, "<job 2>" processing is selected to show an underlined state. Next, by pressing the execution button 62, the selection is determined, the selected print data is deleted, and the display unit 66 displays a state where "canceling" is displayed. As such, since the print data to cancel is selected from the printed data listed on the display unit 66, the user can cancel the desired print data. In addition, since the selected print data is determined with the execution button 62, a malfunction due to double clicking of the cancel button 60 can be prevented.

When the selected print data is deleted at the step S22, the cancel processing ends.

Print data controlled by the above-mentioned cancel processing will now be described in detail.

FIGS. 7A to 7C schematically show situations of the processing of the print data in the data reception unit 84.

For example, print data A (A01 and A02), print data B (B01, B02, and B03), and print data C (C01) are transmitted from the host computer, and sequentially stored into the data reception unit 84. Thus, a state where the print data are sequentially printed is shown. A01 and A02 show one unit such as one page or one job of the print data A, for example. This can also be applicable to B01, B02, . . . , and C01.

FIG. 7A shows a state where the data reception unit 84 stores the print data A01, A02, and B01, and A01 is in printing.

FIG. 7B shows a state where, after a certain time elapses from the state of FIG. 7A, the data reception unit 84 stores new print data B02 and B03, the printing of the print data A01 and A02 ends, the print data A01 and A02 are deleted from the data reception unit 84 (shown in a dotted line), and the print data B01 is in printing. For example, when in the state of FIG. B, if the cancel button 60 is pressed, the print data B in printing is stored into the temporary storage unit 92.

FIG. 7C shows a state where, after a certain time elapses from the state of FIG. 7B, the data reception unit 84 stores new print data C01, the printing of the print data B01 ends, and the print data B01 is deleted from the data reception unit 84 (shown in a dotted line). For example, when in the state of FIG. 7C, if it is determined that the pressed time of the above-mentioned cancel button 60 is larger than the predetermined time, the print data B is stored into the temporary storage unit 92, so that the print data B02 and B03 stored in the data reception unit 84 is canceled (shown in dashed dot line).

Therefore, even when a printing speed is high, a user can immediately cancel the desired print data.

A cancel processing of print data in feeding paper will now be described.

Figure 8:
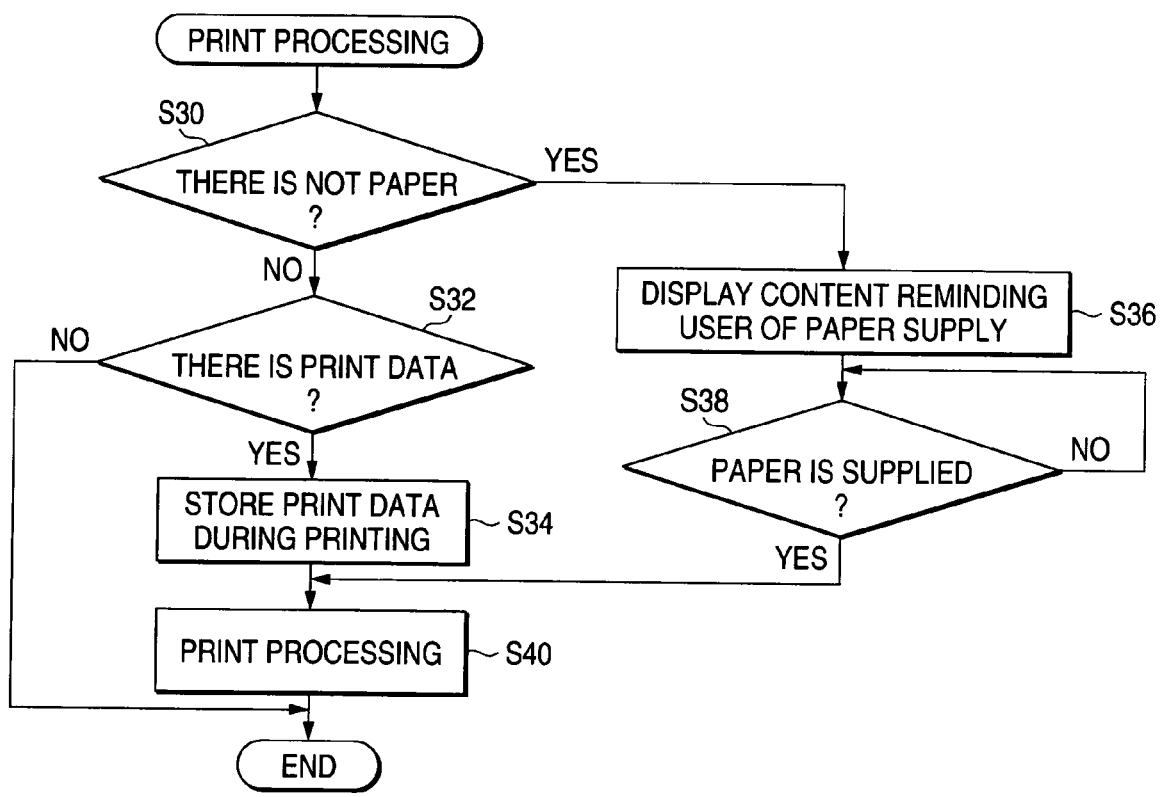
FIG. 8 is a flowchart illustrating another part of an operation flow of a control program for use in an image forming apparatus according to a first embodiment of the present invention.

As shown in FIG. 8, when the print control program begins, it is determined whether there exists a paper in step S30. In other words, it is determined whether there exists a paper in the paper feed tray 16, or whether there exists a paper having a desired size in the paper feed tray 16. In the step S30, when it is determined that there exists a paper, the processing proceeds into step S32, and it is determined whether there exists print data in the data reception unit 84. When it is determined that there exists print data, the processing proceeds into step S34 to store the print data during printing into the temporary storage unit 92 to thus perform a print processing in step S40. On the other hand, when it is determined that there is no print data in the step S32, the print processing ends.

In the step S30, when it is determined that there is no paper, the processing proceeds into the step S36 to display content that reminds a user of paper supply on the display unit 66 of the display panel 54. In an example of FIG. 9, when the paper is run out, the print processing stops, and a state where "hopper 1 A4 supply" is displayed is shown in the display unit 66. In addition, when the print processing stops because the paper is run out as described above, the timer 94 is driven to count a print processing pause time.

Next, in step S38, it is determined whether the paper is supplied into the paper feed tray. When it is determined that the paper is supplied, the processing proceeds into the step S40 to perform the print processing. On the other hand, when it is determined that the paper is not supplied, the processing returns to the step S38, it is determined whether the paper is supplied in the paper feed tray. In other words, it is checked that the paper is supplied in the paper feed tray 16.

Here, when the timer 94 driven at the step S38 is timed up without supplying the paper to the paper feed tray 16, the processing proceeds into the step S40 and the print data for which the print processing is paused is canceled and the next print processing is executed. In an example of FIG. 8, with a timed-up timer 94, the print data for which the print processing is paused is canceled, and a state where "canceling" is displayed is shown in the display unit 66. Next, the next print data processing other than, for example, the A4 sheet begins, and a state where "printing" is displayed is shown in the display unit 66. With this, when the print processing pause time in pausing is determined and the print pause continues more than a predetermined time, the print data in pause is canceled, and the next print data processing is executed, thereby preventing degraded throughput.

A second embodiment of the present invention will now be described with reference to FIGS. 10 and 11.

In addition, the constituent elements described in the first embodiment of the present invention are denoted by the same reference numerals in the second embodiment, so that a description thereof will be omitted.

Figure 10:
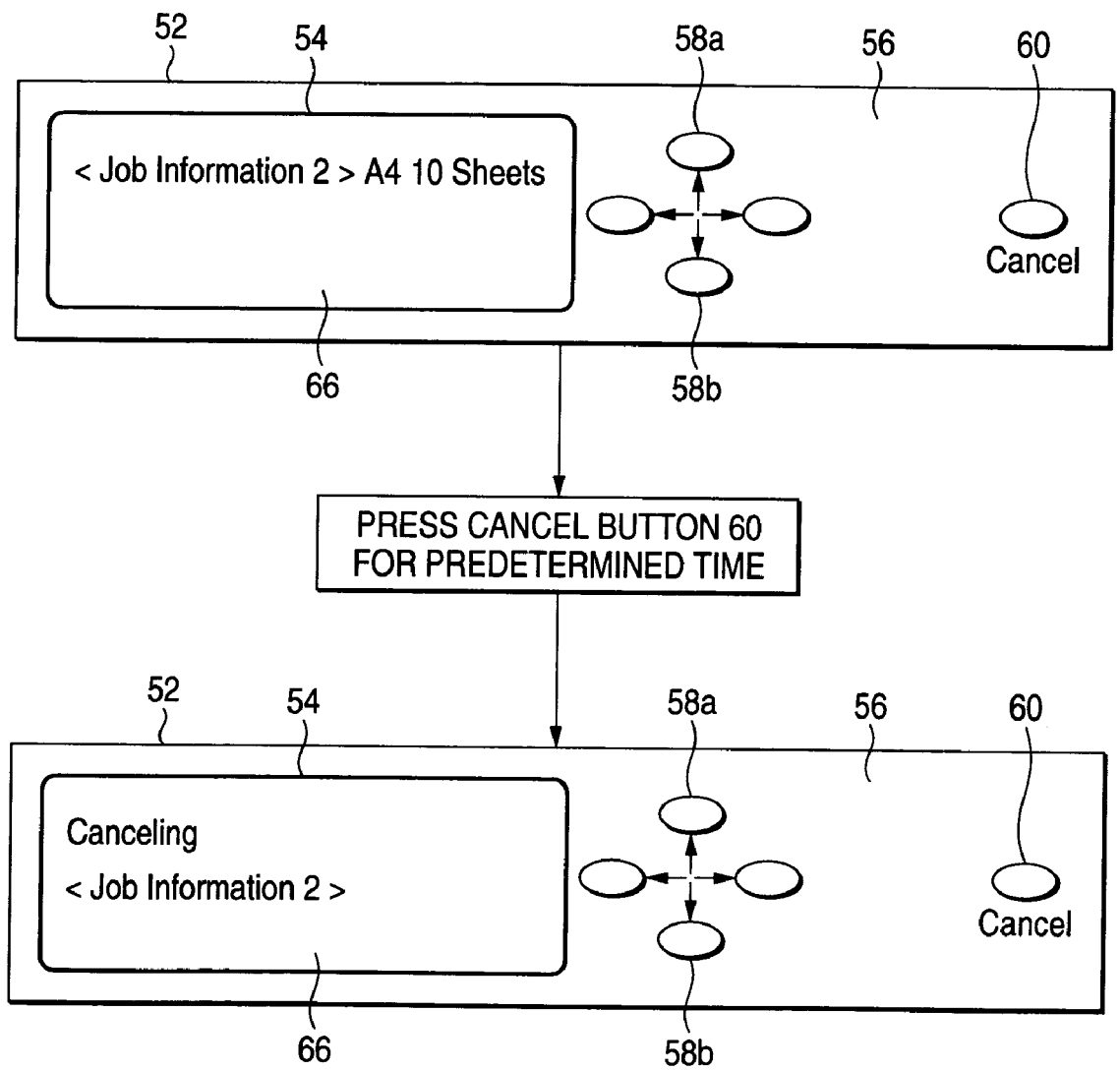
FIG. 10 is a flowchart illustrating a display flow of an UI device for use in an image forming apparatus according to a second embodiment of the present invention.

An UI device 52 shown in FIG. 10 includes a liquid crystal display panel 54 and a control panel 56 having control buttons thereon, for example. The control panel 56 are arranged with print data selection buttons 58a and 58b, and a cancel button 60. In addition, the display panel 54 has a display unit 66 for listing identification information of the print data or situation of the print data.

An operation of the second embodiment of the present invention constructed as described above will now be described with reference to FIGS. 10 and 11.

Figure 11:
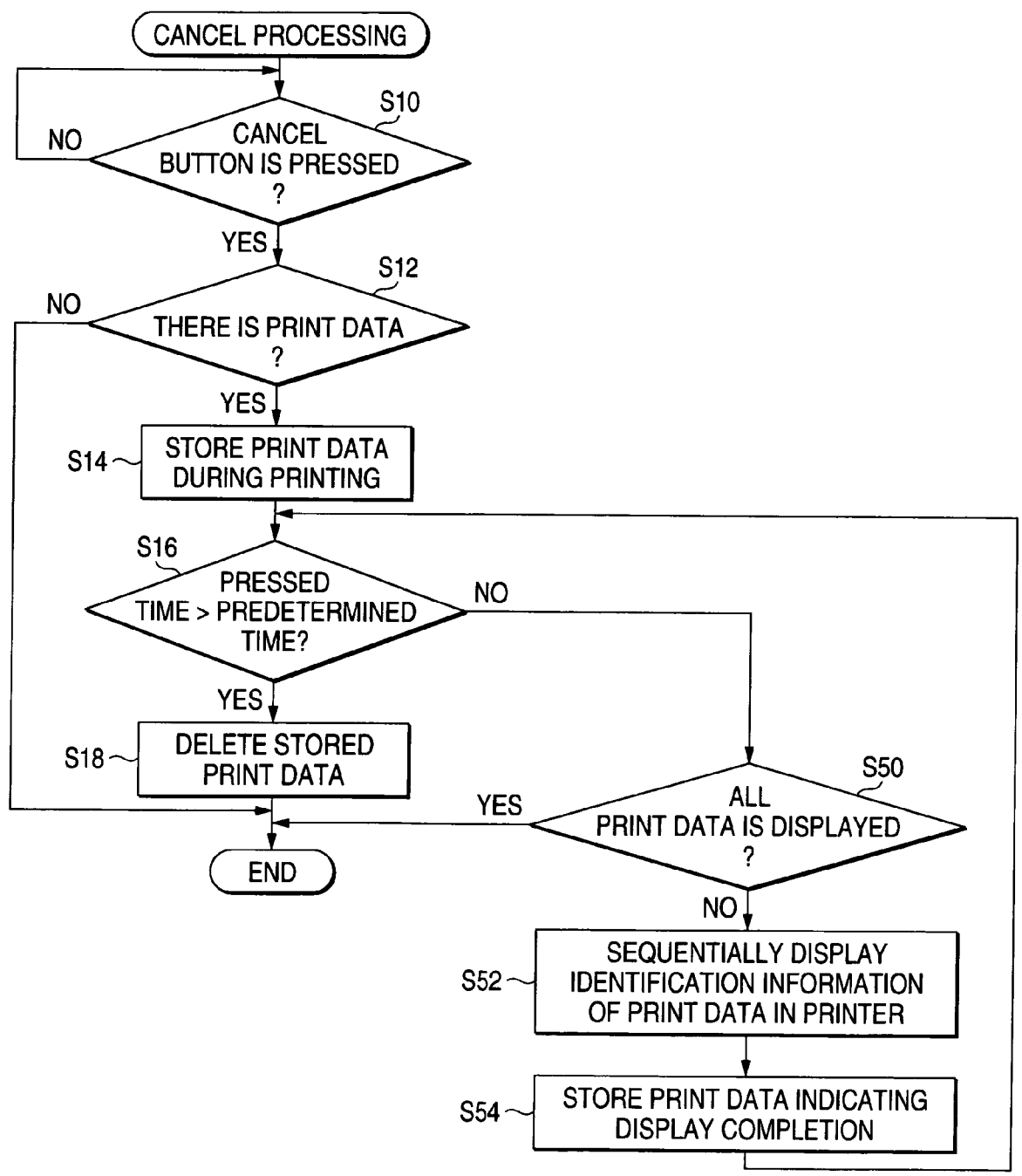
FIG. 11 is a flowchart illustrating an operation flow of a control program for use in an image forming apparatus according to a second embodiment of the present invention.

As shown in FIG. 11, a cancel processing of a print control program begins, and in step S16, it is determined whether a pressed time of the cancel button 60 is larger than a predetermined time. When it is determined that the pressed time of the cancel button 60 is larger than the predetermined time, the print data stored in the temporary storage unit 92 is deleted. When it is determined that the pressed time of the cancel button 60 is less than the predetermined time, the processing proceeds into step S50. In the step 50, it is determined whether identification information of all the print data is displayed on the display unit 66 of the display panel 54. In other words, in next step S52, it is determined whether identification information of all the print data stored in the data reception unit 84 is displayed on the display unit 66. In the step S52, when it is determined that identification information of all the print data is displayed on the display unit 66, the cancel processing ends. On the other hand, when it is determined that identification information of all the print data is not displayed on the display unit 66, the processing proceeds into the step S52, and identification information of the print data stored in the data reception unit 82 is displayed on the display unit 66 from uppermost. In the example of FIG. 10, identification information of the print data stored in the data reception unit 84 is sequentially displayed on the display unit 66, and for example, a state where "job information 2 A4 10 sheets" is displayed is shown.

Next, in step S54, print data indicating display completion on the display unit 66 is stored in the temporary storage unit 92, and returning to the step S16, the pressed time of the cancel button 60 is determined again. In other words, by repeating the cycle from the step S16 to the step S54, print data information of the data reception unit 84 is sequentially displayed on the display unit 66 one by one, and print data information of the temporary storage unit 92 is updated. At this time, by pressing the cancel button 60 for a predetermined time while sequentially displaying print data information, the print data in displaying can be deleted. In an example of FIG. 10, while displaying the "job information 2 A4 10 sheets" on the data information display unit 66, the cancel button 60 is pressed for a predetermined time and the print data in displaying is deleted, and a state where "canceling" is displayed on the data information display unit 66 is shown.

Therefore, the selection of the print data to cancel is performed at a timing to press the cancel button 60, and the determination of the selection of the print data to cancel is performed by that the cancel button 60 is pressed for more than the predetermined time while the information of the print data to cancel is displayed on the display unit 66. Accordingly, the instruction of the cancel of the print data, its selection, and the determination of its selection are operated only with the cancel button 60, so that the number of control buttons can be further reduced.

As described above, the present invention is applicable to an image forming apparatus that can reduce paper waste.

[FIG. 2]
  68: CPU
  70: PROGRAM ROM
  72: RAM
  74: BITMAP MEMORY
  76: HOST INTERFACE
  HOST COMPUTER
  78: USER INTERFACE
  UI DEVICE
  80: PRINT ENGINE INTERFACE
  PRINT ENGINE

[FIG. 3]
  OPERATION INPUT DATA
  PRINT DATA
  92: TEMPORARY STORAGE UNIT
  84: DATA RECEPTION UNIT
  86: INTERPRETATION UNIT
  88: DRAWING UNIT
  90: PRINT CONTROL UNIT
  PRINT ENGINE INTERFACE
  82: CONTROL UNIT
  USER INTERFACE
  94: TIMER

[FIG. 4]
  CANCEL PROCESSING
  S10: IS CANCEL BUTTON IS PRESSED?
  S12: IS THERE PRINT DATA
  S14: STORE PRINT DATA DURING PRINTING
  S16: PRESSED TIME>PREDETERMINED TIME
  S18: DELETE STORED PRINT DATA
  S20: LIST IDENTIFICATION INFORMATION OF PRINT DATA IN PRINTER
  S22: DELETE SELECTED PRINT DATA
  END

[FIG. 5]
  66: PRINTING, <JOB INFORMATION> A4 10 SHEETS
  62: EXECUTION
  60: CANCEL
  PRESS CANCEL BUTTON 60 FOR PREDETERMINED TIME
  66: CANCELING, <JOB INFORMATION> A4 10 SHEET
  62: EXECUTION
  60: CANCEL

Figure 6:
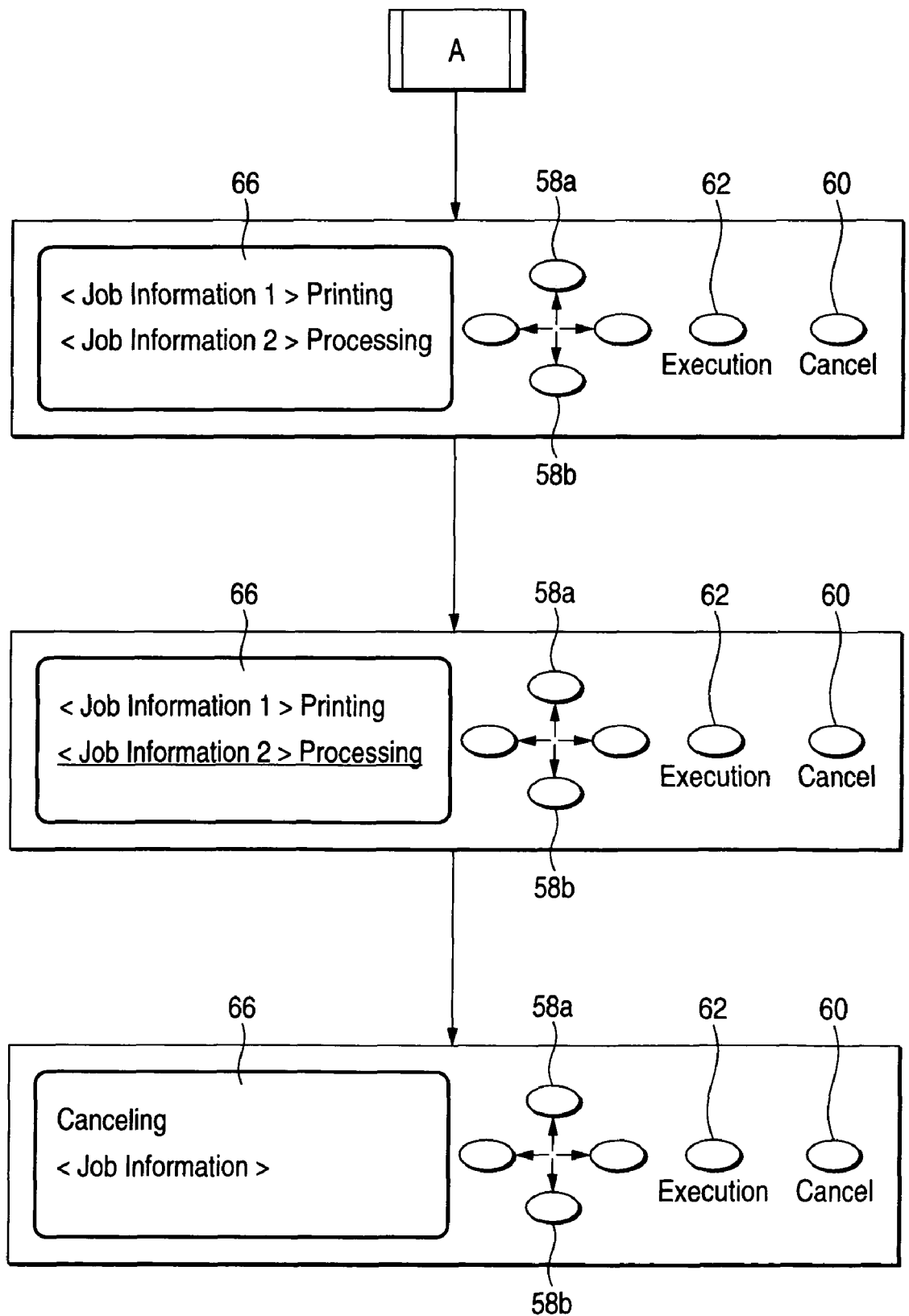
FIG. 6 is a flowchart illustrating another part of a display flow of an UI device for use in an image forming apparatus according to a first embodiment of the present invention.

[FIG. 6]
  <JOB INFORMATION 1> PRINTING
  <JOB INFORMATION 2> PROCESSING
  62: EXECUTION
  60: CANCEL
  <JOB INFORMATION 1> PRINTING
  <JOB INFORMATION 2> PROCESSING
  62: EXECUTION
  60: CANCEL
  66: CANCELING, <JOB INFORMATION>
  62: EXECUTION
  60: CANCEL

[FIG. 8]
  PRINT PROCESSING
  S30: IS THERE NOT PAPER?
  S32: IS THERE PRINT DATA?
  S34: STORE PRINT DATA DURING PRINTING
  S36: DISPLAY CONTENT REMINDING USER OF PAPER SUPPLY
  S38: IS PAPER SUPPLIED?
  S40: PRINT PROCESSING
  END

Figure 9:
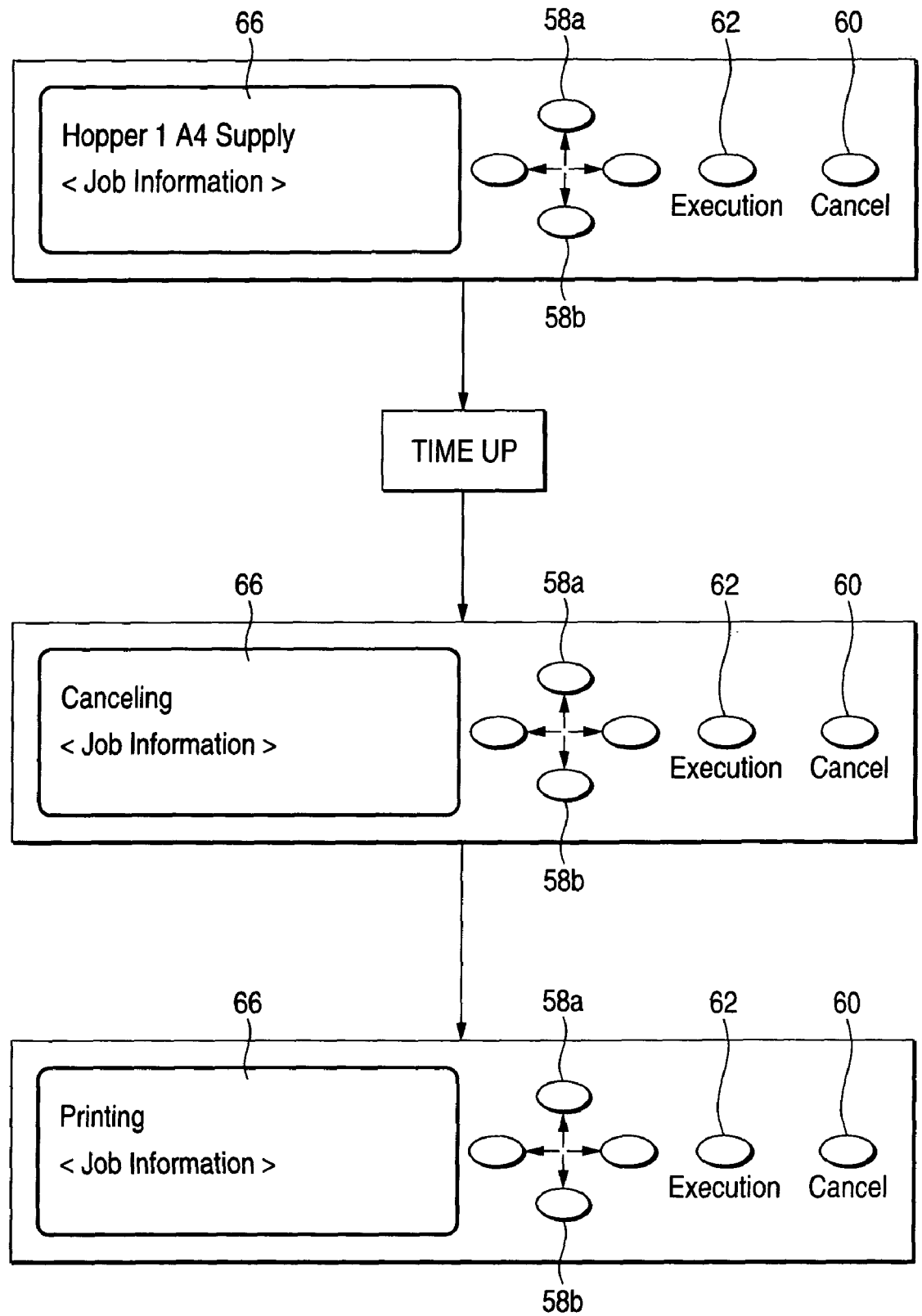
FIG. 9 is a flowchart illustrating a part of a display flow of an UI device for use in an image forming apparatus according to a first embodiment of the present invention.

[FIG. 9]
  66: HOPPER 1 A4 SUPPLY, <JOB INFORMATION>
  62: EXECUTION
  60: CANCEL
  TIME UP
  66: CANCELING, <JOB INFORMATION>
  62: EXECUTION
  60: CANCEL
  66: PRINTING, <JOB INFORMATION>
  62: EXECUTION
  60: CANCEL

[FIG. 10]
  66: <JOB INFORMATION 2> A4 10 SHEETS
  60: CANCEL
  PRESS CANCEL BUTTON 60 FOR PREDETERMINED TIME
  66: CANCELING, <JOB INFORMATION 2>
  60: CANCEL

[FIG. 11]
  CANCEL PROCESSING
  S10: IS CANCEL BUTTON PRESSED?
  S12: IS THERE PRINT DATA?
  S14: STORE PRINT DATA DURING PRINTING
  S16: PRESSED TIME>PREDETERMINED TIME

S18: DELETE STORED PRINT DATA
S50: IS ALL PRINT DATA DISPLAYED?
S52: SEQUENTIALLY DISPLAY IDENTIFICATION INFORMATION OF PRINT DATA IN PRINTER
S54: STORE PRINT DATA INDICATING DISPLAY COMPLETION

What is claimed:

1. An image forming apparatus comprising:
a data reception unit that receives a first print data;
a printing unit that performs a first print processing of the first print data received by the data reception unit;
a first paper feed tray that is configured to contain a paper on which the first print data is to be printed by the printing unit;
a controller that is configured to perform a cancellation of the first print processing of the first print data so as to remove the first print data when the paper contained in the first paper feed tray does not have a desired size to print the first print data and a paper having the desired size is not supplied to the first paper feed tray within a predetermined time, the desired size being a paper size corresponding to the first print data,
wherein the controller is configured to skip all jobs that require the paper having the desired size when the paper having the desired size to print the first print data is not contained in the first paper feed tray and the paper having the desired size is not supplied to the first paper feed tray within the predetermined time, and
wherein the controller determines whether or not all of the first print data is displayed on a display unit,
when the controller determines that all of the first print data is displayed on the display unit, the controller performs the cancellation of the first print processing, and
when the controller determines that all of the first print data is not displayed on the display unit, the controller (i) controls the display unit to display the first print data sequentially and (ii) stores the displayed first print data.

2. The image forming apparatus according to claim 1, further comprising:
a second paper feed tray that is configured to contain a paper having a size which is different from the size of the paper to be contained in the first paper feed tray,
wherein the printing unit performs a second print processing of second print data on the paper contained in the second paper feed tray after the cancellation of the first print processing of the first print data is performed, the second print data being received by the data reception unit after the first print data.

3. The image forming apparatus according to claim 1, wherein, when the paper having the desired size to print the first print data is not contained in the first paper feed tray and the paper having the desired size is not supplied to the first paper feed tray within the predetermined time, the controller is configured to perform a cancellation of the first print processing of the first print data before the print unit performs the first printing processing.

4. An image forming apparatus comprising:
a data reception unit that receives a first print data;
a printing unit that performs a first print processing of the first print data received by the data reception unit;
a first paper feed tray that is configured to contain a paper on which the first print data is to be printed by the printing unit;
a controller that is configured to perform a cancellation of the first print processing of the first print data so as to remove the first print data when the paper contained in the first paper feed tray does not have a desired size to print the first print data and a paper having tile desired size is not supplied to the first paper feed tray within a predetermined time, the desired size being a paper size corresponding to the first print data,
wherein the controller is configured to skip all jobs that require the paper having the desired size without again checking to determine if the paper having the desired paper size is available, and
wherein the controller determines whether or not all of the first print data is displayed on a display unit,
when the controller determines that all of the first print data is displayed on the display unit, the controller performs the cancellation of the first print processing, and
when the controller determines that all of the first print data is not displayed on the display unit, the controller (i) controls the display unit to display the first print data sequentially and (ii) stores the displayed first print data.

5. The image forming apparatus according to claim 4, further comprising:
a second paper feed tray that is configured to contain a paper having a size which is different from the size of the paper to be contained in the first paper feed tray,
wherein the printing unit performs a second print processing of second print data on the paper contained in the second paper feed tray after the cancellation of the first print processing of the first print data is performed, the second print data being received by the data reception unit after the first print data.

6. The image forming apparatus according to claim 4, wherein, when the paper having the desired size to print the first print data is not contained in the first paper feed tray and the paper having the desired size is not supplied to the first paper feed tray within the predetermined time, the controller is configured to perform a cancellation of the first print processing of the first print data before the print unit performs the first printing processing.

* * * * *